No. 621,905. Patented Mar. 28, 1899.
J. L. DOLSON.
SELF LUBRICATING AXLE.
(Application filed Sept. 19, 1898.)
(No Model.)

Witnesses
J. Grant Culverwell,
H. J. Bembard

John L. Dolson, Inventor.
By his Attorneys.
C. A. Snow & Co.

UNITED STATES PATENT OFFICE.

JOHN L. DOLSON, OF CHARLOTTE, MICHIGAN.

SELF-LUBRICATING AXLE.

SPECIFICATION forming part of Letters Patent No. 621,905, dated March 28, 1899.

Application filed September 19, 1898. Serial No. 691,362. (No model.)

*To all whom it may concern:*

Be it known that I, JOHN L. DOLSON, a citizen of the United States, residing at Charlotte, in the county of Eaton and State of Michigan, have invented a new and useful Self-Lubricating Axle, of which the following is a specification.

My invention relates to improvements in self-lubricating axles; and the object of the present improvement is to provide an improved construction of the axle-box by which the lubricant is caused to flow or circulate from the ends of said box toward the middle of the axle arm or spindle, thereby preventing the escape of the lubricant from either end of the axle-box.

A further object of the invention is to secure snug fitting of the rotary axle-box on the spindle or arm, to the end that the admission of dust or dirt to the box will be thoroughly excluded, and thus obviate the abrasion and wear of the spindle and the inner face of the box, and said box is furthermore provided with an annular lubricating channel or groove surrounding the annular axle-collar to insure a plentiful supply of the lubricant at this particular part of the axle.

With these ends in view the invention consists in the novel construction and arrangement of parts which will be hereinafter fully described and claimed.

To enable others to understand the invention, I have illustrated the preferred embodiment thereof in the accompanying drawings, forming a part of this specification, and in which—

Figure 1:
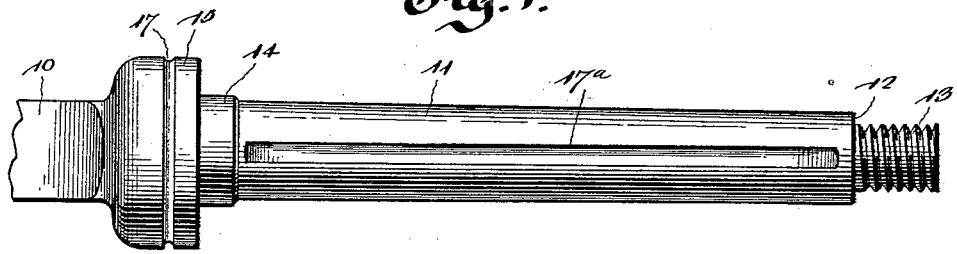
Figure 2:
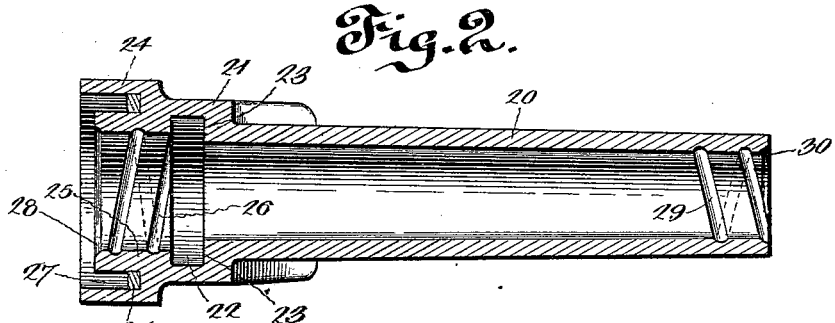
Figure 3:
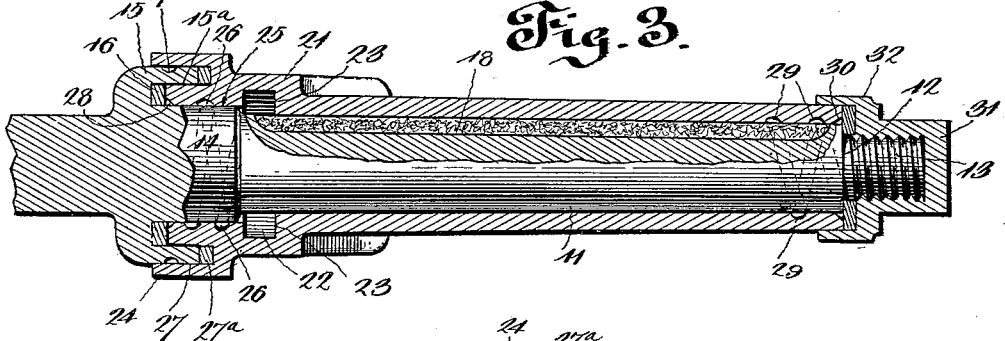
Figure 4:
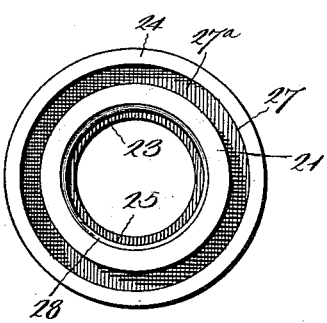

Figure 1 is a plan view of a portion of the axle with the spindle or arm thereof. Fig. 2 is a sectional elevation through the axle-box. Fig. 3 is a sectional view through the box and the axle-spindle assembled in proper relation and with the nut applied to the outer end of the axle-spindle to embrace the corresponding end of the rotatable box. Fig. 4 is an elevation of the inner end of the axle-box.

Like numerals of reference denote like and corresponding parts in each of the several figures of the drawings.

The axle is indicated at 10 and its arm or spindle at 11. As is usual in the art, the spindle is tapered, and at its outer end it has a flat face 12, from which projects a threaded tenon 13 to receive the axle-nut. Near its inner end, where the spindle is joined to the axle, an integral collar 14 is formed on the spindle, and the axle is provided with a cup-flange 15, which is arranged concentric with the collar 14 and overhangs the same to provide an annular space or recess $15^a$ for the reception of the washer 16, which is contained within such cavity. The annular cup-flange 15 is provided with a circumferential groove 17, which is adapted to be snugly embraced by the bell-shaped inner end of the rotatable axle-box, as will presently appear. As is usual in the art, the tapering spindle or arm 11 is provided with a longitudinal groove $17^a$, which extends nearly the full length of said spindle, and in this longitudinal groove is housed or contained a fibrous packing 18, adapted to contact with the inner face of the axle-box. This axle-box 20 is made in a single piece of metal, and its inner end is enlarged to produce a bell by the formation of concentric annular flanges, presently described in detail. The annular flange 21 near the end of the axle-box exceeds the diameter of the box proper where it fits the spindle or arm 11, and this flange 21 produces an annular space 22 and a shoulder 23 within the bell of said box. The larger annular flange 24 constitutes a housing for the cup-flange 15 of the axle, and this flange 24 exceeds the diameter of the flange 21 and the axle-box proper, whereby the bell-shaped inner end of the axle-box is adapted to fit within and around the cup-flange 15 of the axle, so as to form a close joint between the box and axle for the thorough exclusion of dust and dirt from the working faces of the spindle and box. Within the bell-shaped inner end of the box is an integral thimble 25, which is contained within the concentric flanges 21 24, which form said bell-shaped end of the box, and the thimble 25 lies within the larger housing-flange 24, so as to form one of the walls of the annular space 22. The inner face of the internal thimble 25 is formed with a spiral oil-channel 26, which is coiled to incline in a direction toward the axle-box and the annular space 22 thereof. The internal thimble 25 is formed within the housing-flange 24 to provide an annular space 27 between the opposing concentric faces of the thimble and the housing-flange, and this annular space 27 is adapted to receive the edge of the cup-flange 15, so that the cup-flange will ride against a packing-washer 27ª, which is contained within said space 27, while the face of the thimble 25 will ride against the packing-washer 16, contained within the annular space of the cup-flange 15. The inner circumferential edge of the internal thimble is beveled or chamfered, as at 28. A spiral oil-channel 29 is cut or otherwise formed on the inner face of the axle-box at its outer extremity, and this spiral channel 29 is coiled or inclined in a reverse direction to the oil-channel 26 on the inner face of the thimble near the inner extremity of the axle-box. The inner circumferential edge of the axle-box at its outer extremity is beveled or chamfered, as at 30, and said end of the axle-box when the latter is properly fitted on the spindle or arm lies flush with the flat face 12 of the spindle. A nut 31 is screwed on the threaded tenon 13, and this nut has an annular flange 32, arranged to embrace the outer extremity of the axle-box. The annular flange provides a housing for the packing-washer 33, which is contained within the nut to be pressed against the flat face 12 when the nut is screwed home on the tenon of the axle-spindle.

In my improved construction the axle-box slips readily in place on the spindle to bring the inner extremity of the internal thimble 25 within the annular groove of the cup-flange to position said cup-flange in the annular groove between the thimble and the housing-flange, and this housing-flange snugly embraces the cup-flange, all as clearly shown by Fig. 3. With the axle-box properly assembled in relation to the spindle and axle the outer edge of the cup-flange rides against the packing-washer 27ª and the inner edge of the thimble 25 bears against the packing-washer 16, and owing to this disposition of the thimble and cup-flange and the snug fitting of the housing-flange 24 to the cup-flange 15 the admission of dust to the inner end of the axle-box is wholly obviated and the escape of the lubricant from said end of the axle-box is minimized. The opposite or reverse inclination of the spiral oil-channels at the respective ends of the axle-box causes the lubricant on the rotation of said box to flow or circulate toward the middle of the axle-arm, and the lubricant is thus uniformly distributed along the axle arm or spindle and its waste and escape are minimized. The annular space 22, within the flange 21 and at the outer end of the thimble 25, insures the proper supply of the lubricant to the axle-collar 14. The nut 31 makes a close joint with the outer end of the axle-box, and its packing obviates the waste of the lubricant. This nut may be adjusted on the tenon of the axle-spindle to insure proper fitting of the bell-shaped end of the axle-box to the collar and cup-flange of the axle. As is usual, the axle-box may be provided on its outer face with the fins or ribs, by which the box may be keyed in the wheel-hub.

The lubricant may be introduced into the axle-box in any suitable or desired way. As illustrative of one method of introducing the lubricant the axle-box may be removed from the spindle and turned to an upright position, with the axle-nut firmly applied to the outer chamfered end 30 of said box. While the box is in its upright position and with the nut applied to the lower end thereof a suitable quantity of oil may be introduced into the box. The box may now be slipped upon the axle-spindle to assume the position shown by Fig. 3, and the nut is then screwed into place on the tenon of the spindle. The two washers at the inner end of the axle-box and the washer between the end of the box and the nut tend to prevent the escape of the lubricant from the box when in service.

It will be noted by an inspection of Fig. 3 that the washer within the nut caps or spans the joint between the beveled or chamfered edge 30 of the box and the spindle and that this chamfer 30 communicates with the return-channel 29. This is important, because the tendency of the oil to escape is prevented by the packing-washer and the chamfer returns the oil back to the return-channel. The same arrangement exists at the inner end of the axle-box, at which the chamfer 28 communicates with the return-channel 26, and this chamfered end of the box is capped or spanned by the packing-washer 26.

Changes may be made in the form of some of the parts, while their essential features are retained and the spirit of the invention embodied. Hence I do not desire to be limited to the precise form of all the parts as shown, reserving the right to vary therefrom.

Having thus described the invention, what I claim is—

1. An axle-box provided at its inner end with an internal thimble, an annular space between the longitudinal spindle-opening of the box and the thimble, and a spiral oil-return channel on the inner surface of said thimble and opening at one end through the inner edge of the thimble and at its other end into the annular space, in combination with an axle having a cup-flange which embraces the internal thimble, and a packing housed within the cup-flange and spanning the edge of the internal sleeve, substantially as described.

2. An axle-box provided at its inner end with an internal thimble having the chamfered edge, 28, the annular oil-space between the internal thimble and the longitudinal spindle-opening of the box, and a spiral return-channel on the inner face of said thimble and opening at one end into the chamfered edge, 28, and at its other end into the annular oil-space, combined with an axle having a cup-flange which embraces the thimble, and a packing housed within the cup-flange and spanning the chamfered edge of the thimble, substantially as described.

3. An axle-box provided at its inner end with a housing-flange, an internal thimble concentric with the housing-flange to form therewith an intermediate annular recess or space and provided on its inner surface with a spiral oil-channel which is inclined toward the spindle-opening of said axle-box, and another oil-channel within the other end of the axle-box, in combination with a spindle having a collar and a cup-flange, the thimble of the axle-box arranged to fit within the cup-flange, and said cup-flange fitting within the annular space between the internal thimble and the housing-flange, substantially as described.

4. An axle-box provided with the concentric flanges forming the enlarged inner end, and an annular oil-cavity within the smaller annular flange, the internal thimble concentric with the larger flange to produce an annular space between itself and said larger flange, and the oppositely-inclined, spiral, oil-channels within the internal thimble and the outer end of the axle-box, in combination with an axle having a cup-flange which fits in the annular space between the thimble and larger flange of the axle-box and receives the inner end of said thimble, and packing-washers housed within the cup-flange and the annular space between the thimble and flange of the axle-box, substantially as described.

5. An axle-box provided at its inner end with an internal thimble, the chamfer or bevel at the outer edge of the box, another chamfer or bevel at the edge of the internal thimble, and the spiral return-channels on the inner surface of the box and the internal thimble, inclined reversely to each other, and communicating respectively with the chamfers of the box and thimble, combined with an axle fitted in said box and thimble, packing-washers which span the chamfered edges of the box and thimble, and a nut, substantially as specified.

6. An axle-box provided on its inner surface, at its outer end, with a spiral channel which extends only part way of the length of the box, an internal thimble at the inner end of said box and having a spiral oil-channel inclined reversely to the first-named channel, and an annular oil-space between said thimble and the spindle-opening of the box, combined with a spindle fitted to the box and having a longitudinal channel which extends between the annular space and spiral channel, substantially as described.

In testimony that I claim the foregoing as my own I have hereto affixed my signature in the presence of two witnesses.

JOHN L. DOLSON.

Witnesses:
DWIGHT BACKUS,
FRONIE B. BACKUS.